US005620616A

United States Patent [19]

Anderson et al.

[11] Patent Number: 5,620,616

[45] Date of Patent: *Apr. 15, 1997

[54] PLASMA TORCH ELECTRODE

[75] Inventors: Brad J. Anderson, Cameron Park; Scott N. Sieger, Fair Oaks, both of Calif.

[73] Assignee: Aerojet General Corporation, Rancho Cordova, Calif.

[ * ] Notice: The term of this patent shall not extend beyond the expiration date of Pat. No. 5,455,401.

[21] Appl. No.: 508,092

[22] Filed: Jul. 27, 1995

Related U.S. Application Data

[63] Continuation-in-part of Ser. No. 321,707, Oct. 14, 1994, Pat. No. 5,455,401.

[51] Int. Cl.$^6$ .................................................... B23K 10/00

[52] U.S. Cl. ............................... 219/121.52; 219/121.49; 219/121.5; 219/119; 313/231.21

[58] Field of Search .............................. 219/121.52, 119, 219/121.48, 121.49, 121.51, 121.42, 121.5, 75; 313/231.21, 231.31, 231.41

[56] References Cited

U.S. PATENT DOCUMENTS 3,140,421 7/1964 Spongberg .
3,304,774 2/1967 Poole .
4,304,980 12/1981 Fridlyand et al. .
4,405,853 9/1983 Klein .
4,431,901 2/1984 Hull .
4,628,177 12/1986 Dempsey et al. .
4,716,269 12/1987 Carkhuff .
4,748,312 5/1988 Hatch et al. .
4,780,591 10/1988 Bernecki et al. .
4,992,642 2/1991 Kamp et al. .
5,013,885 5/1991 Carkhuff et al. .
5,206,481 4/1993 Rossner et al. .
5,247,152 9/1993 Blankenship .

*Primary Examiner*—Mark H. Paschall
*Attorney, Agent, or Firm*—Townsend and Townsend and Crew LLP

[57] ABSTRACT

A plasma torch electrode (132) comprises multiple platelets (159) oriented transverse to the electrode axis and joined together to form an electrical connection therebetween. A first group of the platelets have openings aligned to form an axial bore (164) for generating a plasma arc. A second group of the platelets define channels (172,178) aligned with each other, transverse to the electrode axis and in communication with the bore for injecting a gas, such as an inert gas, into the bore. In a specific embodiment, the plasma torch electrode comprises first and second end plates (152, 154) and a midplate (160), with the platelets stacked between and joined to the end plates and the central plate. This configuration allows precise fabrication of gas channels within the first and second sets of platelets while only requiring a small number of separate components to manufacture the plasma torch electrode.

15 Claims, 5 Drawing Sheets

PLASMA TORCH ELECTRODE

CROSS-REFERENCE TO RELATED APPLICATIONS

This application is a continuation-in-part of application Ser. No. 08/321,707 filed Oct. 14, 1994, now U.S. Pat. No. 5,455,401 the complete disclosure of which is incorporated herein by reference.

BACKGROUND OF THE INVENTION

This invention relates to plasma torches generally, and more specifically to a platelet cooled electrode for a plasma torch.

Plasma torches are commonly used for cutting, welding and spray bonding of workpieces in numerous applications such as toxic waste disposal, metal processing and ash vitrification. Plasma torches generally operate by directing a plasma consisting of ionized gas particles toward the workpiece. A gas to be ionized is channeled between a pair of electrodes and directed through an orifice at the front end of the torch. A high voltage is applied to the electrodes causing an arc to jump the gap between the electrodes, thereby heating the gas and causing it to ionize. The ionized gas flows through the orifice and appears as an arc or flame. In an alternate application, only a single electrode is used and a transferred or cutting arc jumps from the electrode directly to the workpiece.

During the operation of a conventional plasma torch, the torch becomes very hot, especially the surfaces of the electrodes that are directly exposed to the plasma arc. Sufficient cooling must be provided during normal operation to prevent these electrode surfaces from either melting or deteriorating too rapidly. To cool the electrodes, fluid coolant, such as water or gas, is directed through channels or passageways in the electrodes to transfer heat away from the hot electrode surfaces through convection. Typically, the electrodes are manufactured in one piece and the coolant channels are then machined into the finished electrodes using conventional techniques.

Among the drawbacks with conventional plasma torches is that the process of machining coolant channels into the electrodes is limited. It is extremely difficult to precisely machine the coolant channels so that an effective heat transfer area exists between the channels and the electrode surfaces that are exposed to the hot plasma gas. Therefore, these surfaces overheat and rapidly deteriorate with use.

Another drawback with conventional plasma torches is that the plasma arc passing through the electrodes attaches to the exposed surfaces and rapidly erodes these surfaces. Often, the plasma arc will attach only to specific localized areas on these surfaces which quickly overheats and erodes these areas and substantially decreases the life of the electrode.

SUMMARY OF THE INVENTION

The present invention provides a plasma torch electrode constructed with platelet technology to permit precision fabrication of gas channels for cooling the electrode and for protecting the inner wall surface of the electrode from chemical oxidation. Specifically, the plasma torch electrode of the present invention comprises multiple platelets oriented transverse to the electrode axis and joined together to form an electrical connection therebetween. A first group of the platelets have openings aligned to form a central bore through the electrode for generating a plasma arc. A second group of the platelets define gas channels aligned with each other, transverse to the electrode axis and in communication with the bore for injecting a gas, into the bore. The gas, e.g., an inert gas, protects the bore from chemical oxidation and provides a cool barrier around the exposed surface of the bore.

The platelets further define multiple passageways coupling the gas channels with the central bore. The passageways are spaced in specified intervals along the electrode axis to inject gas along the entire length of the bore. The passageways are preferably oriented so that the gas flows in a non-radial direction toward the bore. This causes the gas to swirl around the bore surface to enhance gas coverage of this surface. In addition, the swirling gas barrier causes the plasma arc to attach uniformly to the bore surface to minimize or eliminate local area attachment of the plasma arc.

In a specific configuration, the plasma torch electrode comprises first and second end plates and a central plate. A first set of platelets are stacked between and joined to the first end plate and the central plate and a second set of platelets are stacked between and joined to the second end plate and the central plate. The plates are substantially thicker than the platelets, thereby allowing precise fabrication of gas channels within the first and second sets of platelets while only requiring a small number of separate components to manufacture the electrode. This reduces the manufacturing cost of the electrode and provides a constant number of required platelets regardless of the size of the electrode.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

Figure 1:
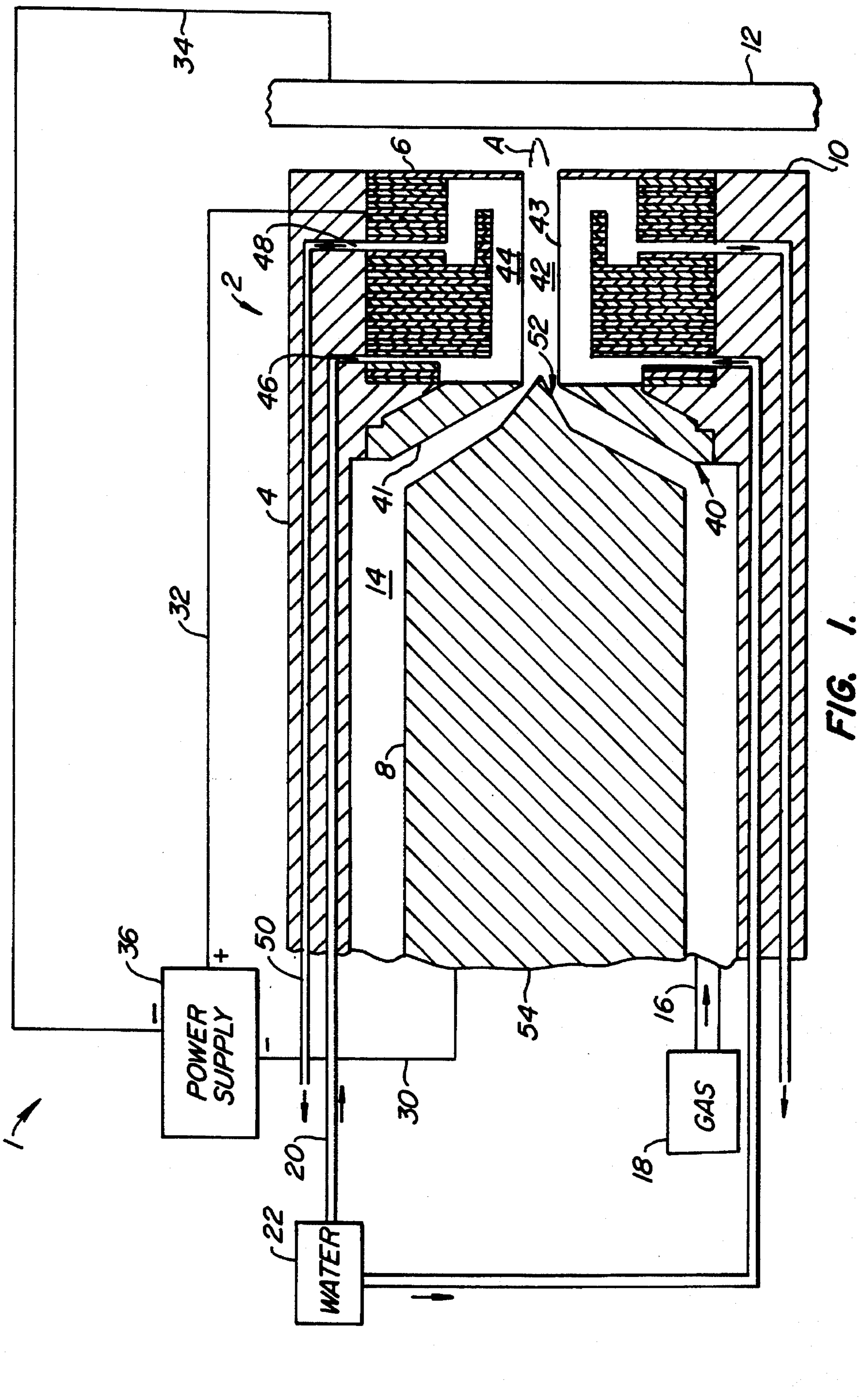
FIG. 1 is a schematic of a plasma torch system constructed according to the principles of the present invention with the plasma arc torch electrode in longitudinal section.

Referring to the drawings in detail, wherein like numerals indicate like elements, plasma torch electrode 6 is shown constructed according to the principles of the present invention. It should be understood, however, that although plasma torch electrode 6 is shown and described as part of a particular plasma torch system 1, it is not intended to be limited in that manner. That is, electrode 6 can be used with other torches or plasma torch systems.

Referring to FIG. 1, plasma torch system 1 comprises plasma torch 2, power source 36, and gas and coolant sources 18 and 22. The power, gas and coolant sources can be of conventional construction. For example, power source 36 can be a DC or AC/DC power source suitable for plasma welding with plasma torch 2 connected thereto as is conventional in the art. As schematically shown in FIG. 1, power supply 36 is connected by lines 30 and 32 to electrode 8 and electrode 6, respectively, to apply a high-frequency voltage between electrode 6 and electrode 8 to generate an arc. Alternatively, power supply 36 can be connected by lines 32 and 34 to electrode 6 and workpiece 12 to generate a transferred arc.

As to the gas and coolant sources, gas source 18 provides a gas, such as a supply of compressed air, which is suitable for generating a plasma gas. Gas source 18 may also provide an inert gas, such as argon, for protecting electrode 6 from chemical oxidation caused by the plasma arc, as will be discussed in more detail below. Coolant source 22 is preferably a liquid reservoir connected to a conventional pump (not shown) for pumping liquid coolant, such as water, through coolant line 20 and into electrode 6. Alternatively, coolant source 22 may supply coolant in the form of a compressed gas to cool electrode 6.

Referring to FIG. 1, plasma torch 2 generally includes a housing 4 and electrodes 6 and 8, which are positioned within housing 4 such that electrode 8 extends into electrode 6 for generating an arc. More specifically, housing 4 has a working end 10 shown positioned near a workpiece 12. Housing 4 forms chamber 14 in which electrodes 6 and 8 are positioned. A gas line 16 couples chamber 14 to gas source 18 and a coolant line 20 couples electrode 6 to coolant source 22. It should be noted that other configurations for circulating coolant and plasma gas can be used in conjunction with the present invention.

Figure 2A:
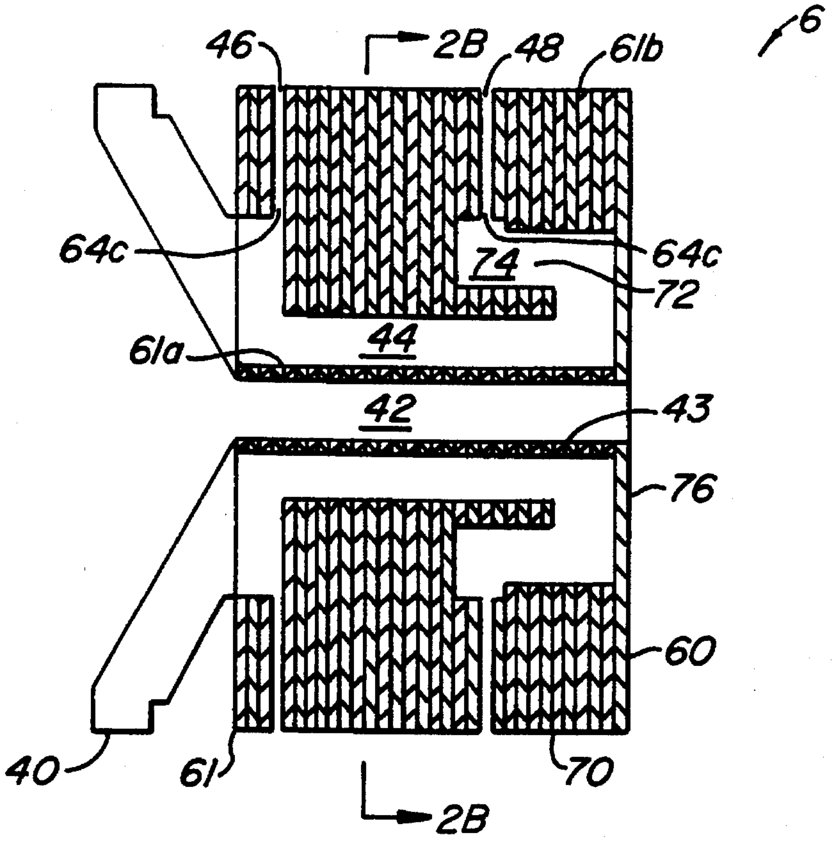
FIG. 2A is an enlarged view of the plasma arc torch electrode shown in FIG. 1.
Figure 2B:
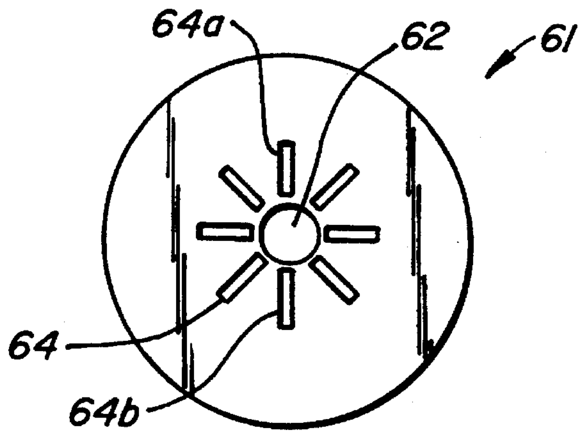
FIG. 2B is a sectional view of the electrode of FIG. 2A taken along line 2B—2B in FIG. 2A.

Referring to FIGS. 1, 2A and 2B, the preferred construction of electrode 6 will be discussed. Electrode 6 comprises a body 60 having holes formed therethrough and arranged so that the holes form a center bore or passageway 42 for receiving electrode 8 and axial coolant channels 44 for cooling bore 42. Electrode 6 further includes a member 40 for attaching electrode 6 to housing 4 in chamber 14 near working end 10. In the preferred embodiment, member 40 includes a frustoconical surface 41 that faces electrode 8 and forms an annular opening or passage between electrode 8 and member 40. The annular opening channels the torch gas into bore 42 such that the arc attaches at an inner surface 43 of bore 42.

Bore 42 is open-ended to allow the plasma arc to travel from electrode 8 to workpiece 12. Bore 42 forms inner surface 43 of electrode 6 that is exposed to the plasma arc during operation of plasma torch 2. Coolant channels 44 are preferably concentrically arranged around bore 42 to provide uniform heat transfer to exposed surface 43. Coolant channels 44 extend from inlets 46, which are coupled to coolant line 20, through electrode 6 to outlets 48, which are coupled to a discharge line 50 for discharging the coolant.

Electrode 8 has a first end portion 52 extending into bore 42 of electrode 6 and a second end portion 54 connected to power supply 36 by line 30. Electrode 8 is a cathode preferably made of thoriated tungsten as is conventional in the industry, but may be constructed of a variety of conventional materials as would be apparent to one of ordinary skill in the art.

In operation, power supply 36 provides a DC voltage between electrode 6 and electrode 8 to create an arc within bore 42. Concurrently, compressed gas from source 18 flows through gas line 16 into bore 42 and is ionized by the arc. This generates a plasma A that is emitted through the open end of electrode 6 and directed toward workpiece 12 to operate thereon for cutting, welding or spray bonding. In the transferred arc configuration, power supply 36 provides DC voltage between electrode 6 and workpiece 12. Heating of workpiece 12 occurs both by impingement of the plasma as well as by resistance heating resulting from current flow through workpiece 12.

Plasma arcs typically have a temperature between about 4,000° C. to 25,000° C., which could melt or quickly erode the exposed surface 43 of electrode 6. To cool electrode 6 during operation of the torch, coolant source 22 pumps water through coolant line 20 to inlets 46 of electrode 6. The water flows through coolant channels 44 and extracts heat from exposed surface 43, thereby cooling this surface and heating the water. The warmer water then exits electrode 6 through outlets 48 and is discharged through discharge line 50.

Referring to FIGS. 1, 2A and 2B, electrode 6 will be described in detail. Electrode 6 includes a plurality of generally longitudinally extending coolant channels 44 disposed adjacent to bore 42 to maximize heat transfer from the coolant channels 44 to the exposed surface 43 of bore 42. To facilitate manufacture of these channels, electrode 6 is preferably formed using platelet construction. In the preferred embodiment, electrode 6 generally comprises a stack of platelets 61 that have been joined together in any of a variety of ways, such as diffusion bonding or brazing. Diffusion bonding involves hot-pressing the platelets 61 together at elevated temperatures. The diffusion bonding causes grain growth between platelets 61, thereby generating a monolithic structure with properties of the parent material. Platelets 61 are thin sheets of metal, such as copper or a copper alloy. Copper has favorable characteristics for electrode 6 because it is very ductile and has a high thermal conductivity. Preferably, platelets 61 are generally circular and have a width of about 0.001 to 0.1 inch. However, platelets 61 may comprise other materials and may have other configurations, e.g., rectangular or triangular.

Referring to FIG. 2B, each platelet 61 has an opening 62 near its center and a plurality of coolant openings 64 disposed radially outward from opening 62. As discussed above, platelets 61 are arranged so that openings 62 form bore 42 and coolant openings 64 form coolant channels 44. For example, FIG. 2A shows two coolant channels 44 oriented 180° from each other corresponding to coolant openings 64*a* and 64*b* in FIG. 2B. Note that other configurations are possible, such as a single annular coolant channel that completely surrounds bore 42.

Opening 62 and coolant openings 64 are stamped, chemically etched, or laser cut into each platelet before the platelets are bonded together. The openings 62, 64 are superimposed onto adjacent platelets 61 to create the desired network or flowpath through the stack. This construction permits precision fabrication of channels 44 and bore 42. A suitable description of a method of chemical etching is disclosed in U.S. Pat. No. 3,413,704, which is incorporated herein by reference.

As shown in FIG. 2A, one of the platelets 61*a* has coolant openings 64*c* that extend radially to an outer surface 70 of electrode 6. These larger coolant openings 64*c* serve to fluidically couple coolant channels 44 to inlets 46. The small size of inlets 46 (i.e., the width of one platelet) compared to coolant line 20 provides an effective metering of the coolant flow to ensure even distribution to each coolant channel 44. The inlets 46 accomplish metering in the same manner as an orifice, creating a pressure drop as the fluid passes through them. The pressure drop across the inlets 46 is large compared to the pressure drop in the channels 44. Therefore, the flow rate is insensitive to perturbations in the channels 44 caused by arc heating effects.

A group of platelets 61*b* have apertures 72 that are disposed radially outward from coolant openings 64. Apertures 72 (not shown in FIG. 2B) are aligned to form axial extensions 74 of coolant channels 44 that fluidically couple coolant channels 44 to outlets 48. Extensions 74 serve to direct flow upstream and away from workpiece 12 before the coolant exits outlet 48. Like inlets 46, outlets 48 are fluidly coupled to extensions 74 by larger coolant openings 64*c* in one of the platelets 61*b*.

It will be noted that the invention is not limited to the coolant channel configuration described above and shown in FIGS. 2A and 2B. For example, coolant channels 44 may exit electrode 6 radially, without axial extensions 74, so that the coolant exits near the downstream end 10 of housing 4. In addition, more than one platelet 61 could have a coolant opening 64*c* that extends radially to outer surface 70 of electrode 6 to increase the width of outlets 48 and/or inlets 46 or to create more than one outlet 48 or inlet 46' for each coolant channel 44.

Coolant openings 64 are etched so that coolant channels 44 are formed immediately adjacent to bore 42 thereby reducing the distance between the hot plasma arc in bore 42 and the liquid coolant. With platelet construction, this distance can be as low as 0.03 inches, preferably about 0.03–0.05 inches. This facilitates heat transfer which reduces the temperature of the inner wall of electrode 6 and promotes temperature uniformity around exposed surface 43. In addition, coolant openings 64 are essentially the same size so that coolant channels 44 are essentially straight. This effectively eliminates stagnant flow regions which could develop in curved channels or channels having uneven walls and cause the water to quickly heat up to boiling temperature.

Coolant channels 44 are generally parallel to bore 42 and extend substantially along the entire length of bore 42. In the preferred embodiment, all of the platelets 61 have coolant openings 64 except for an end platelet 76. In this manner, coolant channels 44 extend downstream to end platelet 76 so that the coolant can flow almost completely along bore 42. This increases the surface area between bore 42 and coolant channels 44, thereby facilitating heat transfer between the coolant and exposed surface 43 of bore 42.

Figure 3A:
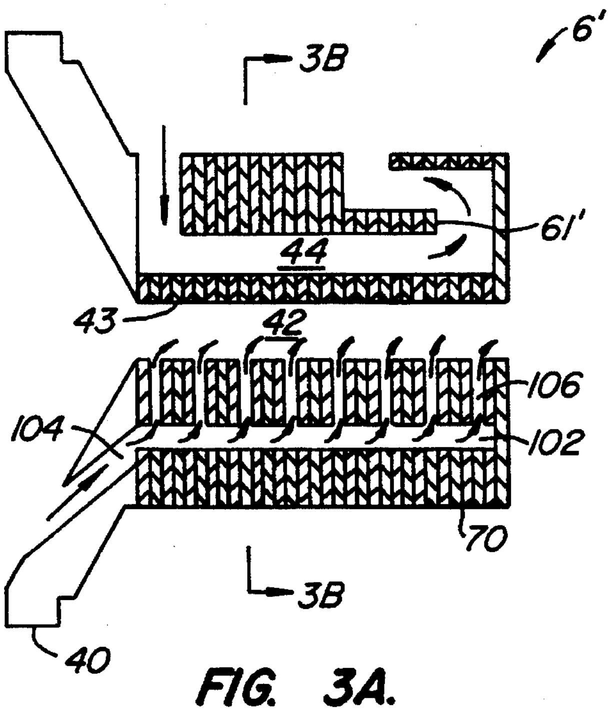
FIG. 3A is a longitudinal section of another embodiment of the plasma torch electrode of FIG. 1 according to the present invention.
Figure 3B:
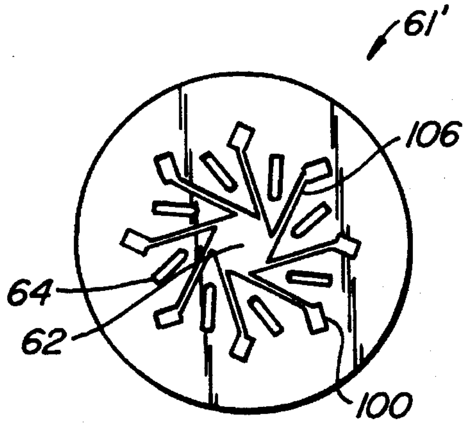
FIG. 3B is a sectional view of the electrode of FIG. 3A taken along line 3B—3B in FIG. 3A.

FIGS. 3A and 3B show another embodiment of electrode 6. In this embodiment, each platelet 61' further includes a plurality of gas openings 100 disposed radially outward from opening 62. Gas openings are aligned to form a plurality of gas channels 102 through electrode 6'. Gas channels 102 have inlets 104 coupled to a source of gas via a gas line (not shown). Some of the platelets 61' further include slots 106 that interconnect gas openings 100 to openings 62 so that gas channels 102 are fluidically coupled to bore 42.

With this configuration, a gas can be injected into bore 42 via slots 106 to protect surface 43 of electrode 6. The injected gas can be the same or different from the primary torch gas. It may be an inert gas, such as argon, which protects the surface from chemical oxidation. Slots 106 preferably extend in a non radial direction toward openings 62 so that the gas will swirl around the exposed surface 43 of electrode 6'. This promotes arc foot rotation thereby eliminating the erosion which occurs when the arc foot rotates too slowly, or not at all. In addition, the gas provides a cool barrier that will supplement the liquid coolant flowing through coolant channels 44.

As shown in FIG. 3B, gas openings 100 are preferably concentrically positioned around axial openings 62 to provide a uniform gas barrier around surface 43. Injecting gas through slots 106 allows gas openings 100 to be positioned away from bore 42, preferably a distance of about 0.1 to 0.2 inches. This relatively large distance ensures that the gas flow rate through gas channels 102 and into slots 106 will not be significantly affected by plasma pressure or temperature variations in bore 42 of electrode 6'.

Figure 4A:
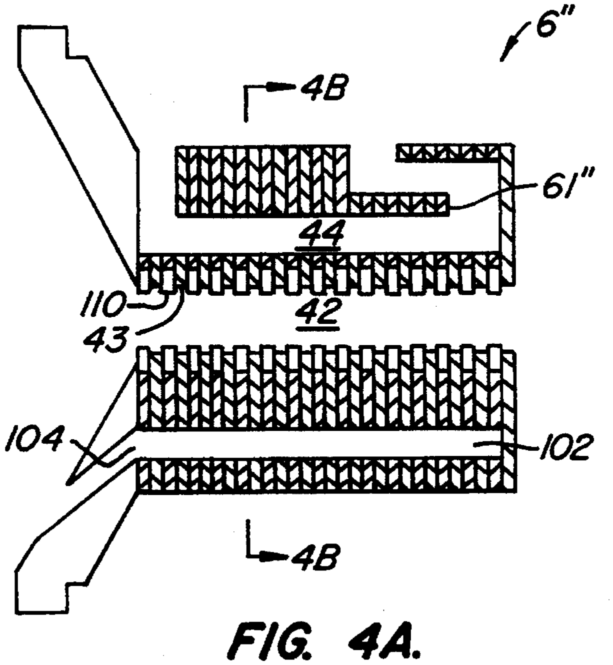
FIG. 4A is a longitudinal section of a further embodiment of the plasma torch electrode of FIG. 1 according to the present invention.
Figure 4B:
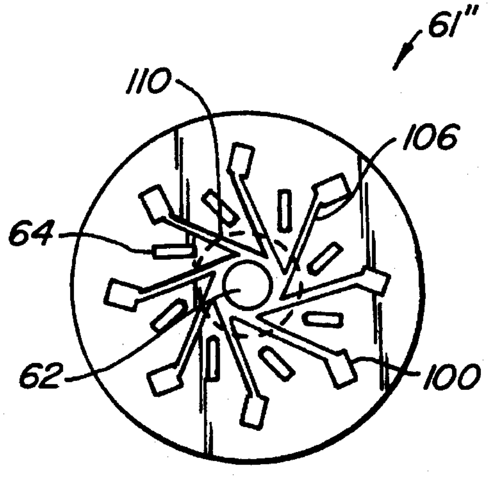
FIG. 4B is a sectional view of the electrode taken along line 4—4 in FIG. 4A.

FIGS. 4A and 4B illustrate a further embodiment of electrode 6". This embodiment includes gas channels 102 and coolant channels 44 as in the previous embodiment. To further protect electrode 6", annular inserts 110 are positioned within the openings 62 of some of the platelets 61". As shown in FIG. 4A, inserts 110 are preferably positioned in alternate platelets 61", but other configurations will be apparent to one of ordinary skill in the art. Annular inserts 110 extend into bore 42 so that they are closer to the plasma arc than the exposed surface 43 of electrode 6". Therefore, the plasma arc will attach to inserts 110, rather than electrode 6", so that inserts 110 will absorb the majority of the heat from the plasma arc.

Inserts 110 are preferably made from a material having a high melting temperature, low vapor pressure and good oxidation resistance. Preferably, this material is zirconium, iridium or platinum in an oxidizing environment or a high-temperature material such as tungsten in an inert environment. Typically, it is difficult to manufacture an electrode entirely from these high-temperature materials because they are difficult to machine. Providing a material such as zirconium or tungsten only where it is needed (i.e., at the hot gas surface) decreases erosion, thereby increasing the lifetime of the electrode while maintaining copper for the electrode body.

Figure 1A:
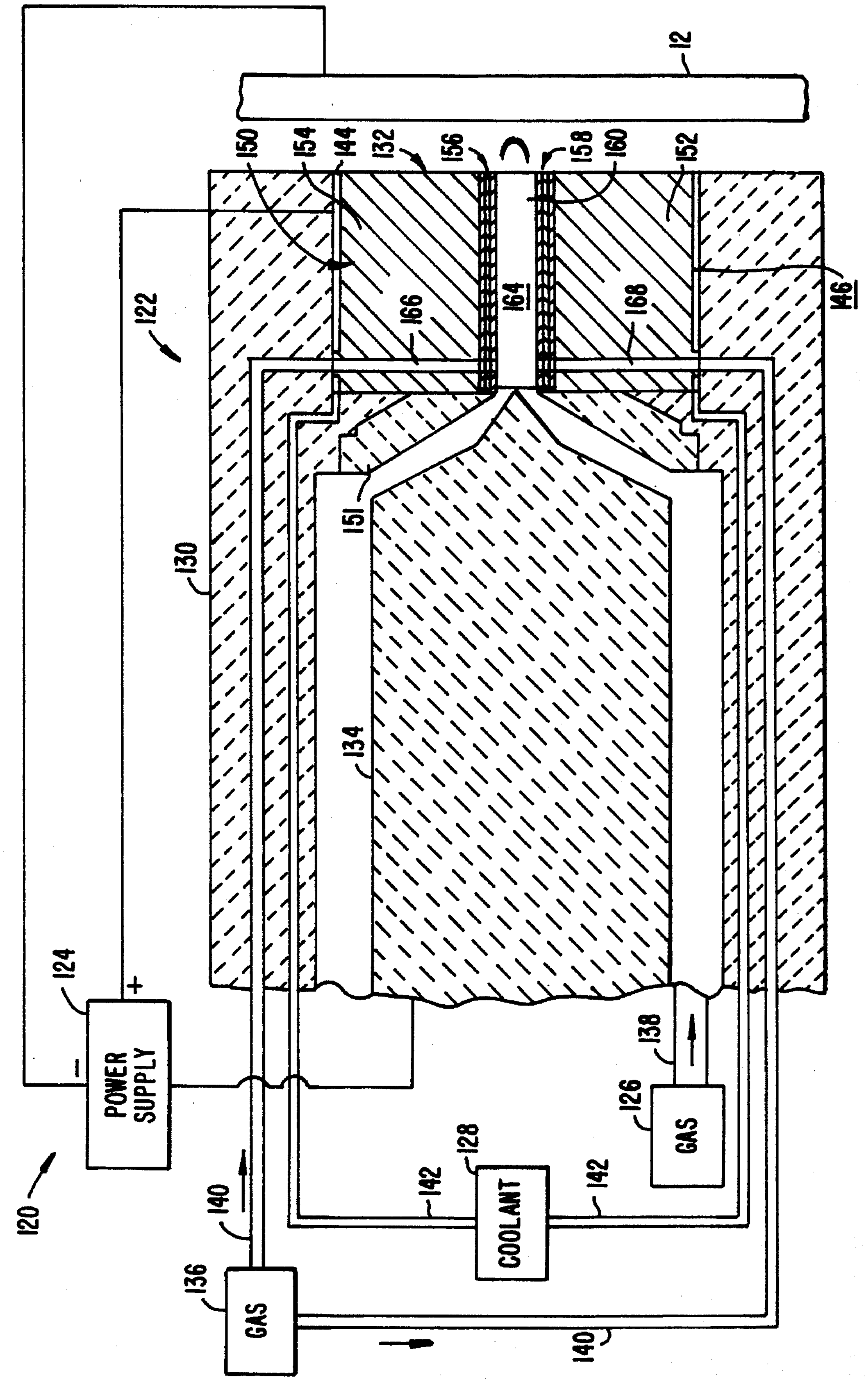
FIG. 1A is a schematic of another plasma torch system with the plasma arc torch electrode in longitudinal section.

Referring to FIG. 1A, an alternative plasma torch system 120 will now be described. Similar to the above embodiment, plasma torch system 120 comprises a plasma torch electrode 122, a power supply 124, and gas and coolant sources 126 and 128. Plasma torch 122 generally includes a housing 130 and electrodes 132 and 134, which are positioned within housing 130 such that electrode 134 extends into electrode 132 for generating an arc. Plasma torch system 120 includes a secondary gas source 136 that supplies an inert gas, such as argon, for protecting electrode 132 from chemical oxidation caused by the plasma arc. Gas lines 138, 140 couple gas sources 126, 136, respectively, to electrode 132. Coolant lines 142 couple coolant source 128 to an annular gap 144 between an outer surface 146 of electrode 132 and housing 130. During operation of plasma torch 122, coolant is directed through annular gap 144 to transfer heat away from outer surface 146 of electrode 132.

Figure 5A:
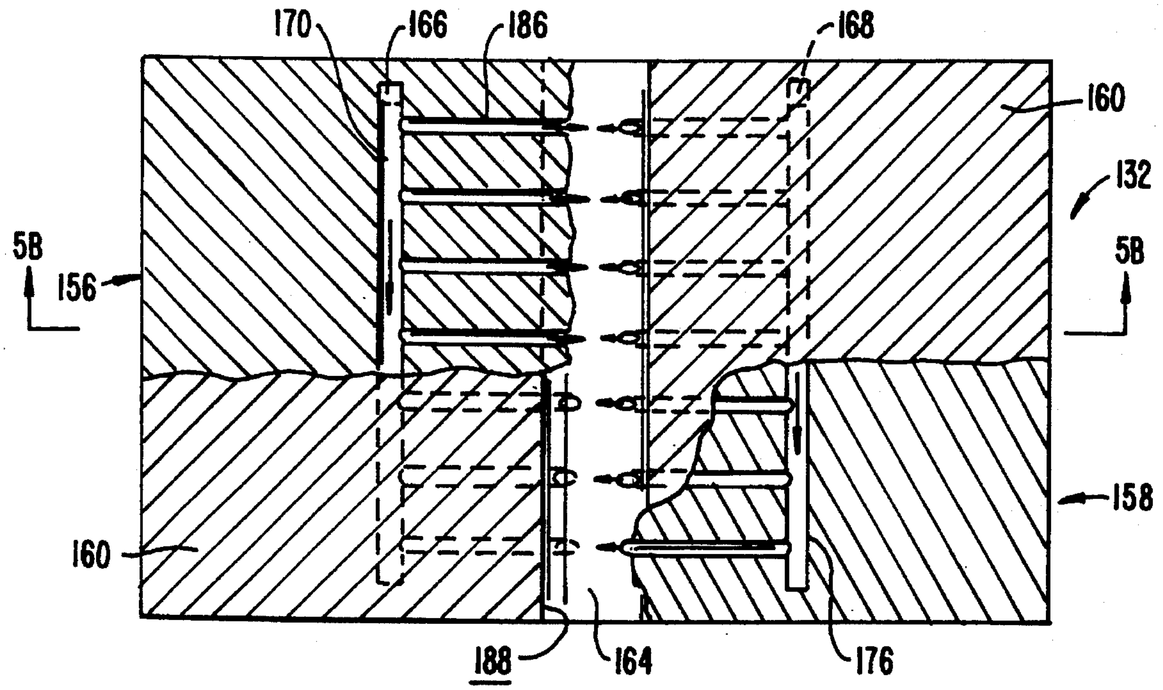
FIG. 5A is a longitudinal section of the plasma torch electrode of FIG. 2.
Figure 5B:
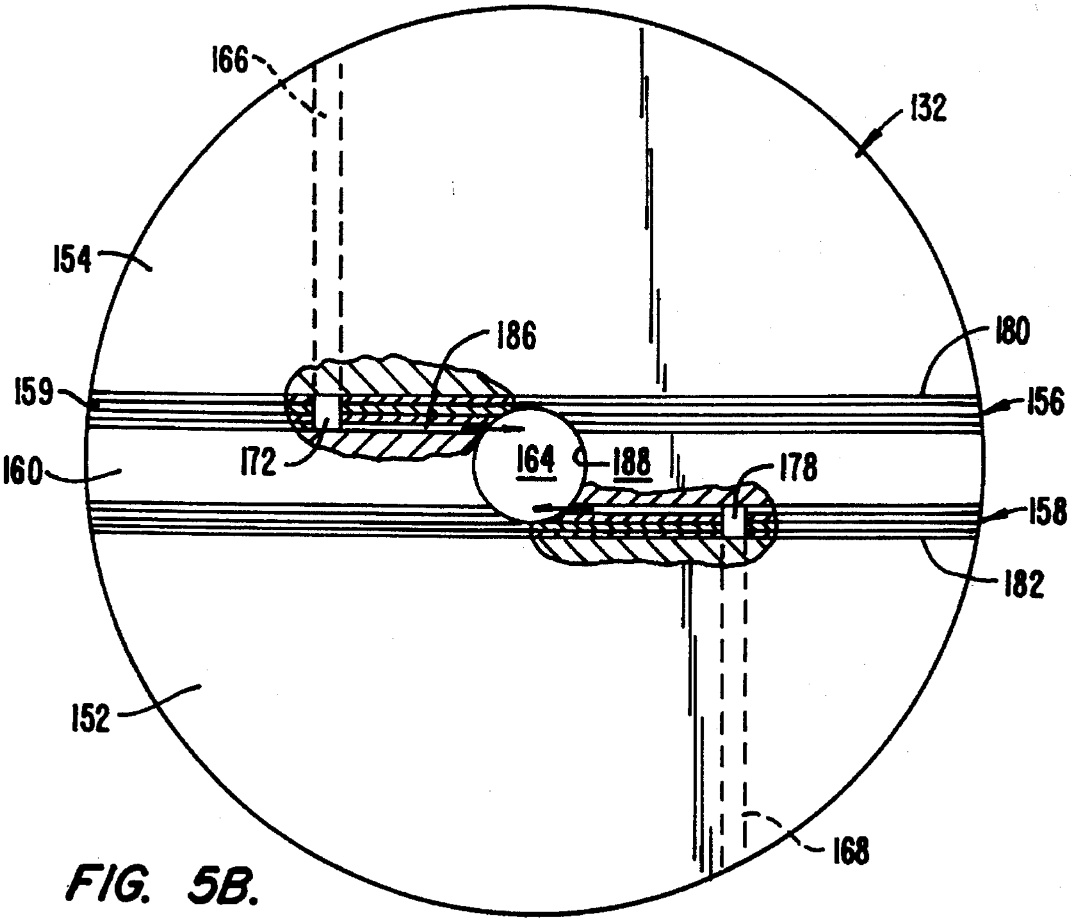
FIG. 5B is a sectional view of the electrode taken along line 5—5 in FIG. 5A.

Referring to FIGS. 1A, 5A and 5B, the preferred construction of electrode 132 will be discussed. Similar to the above embodiments, electrode 132 comprises a body 150 and a frustoconical member 151 for attaching electrode 132 to housing 130 near the working end of plasma torch 122. Body 150 comprises first and second generally longitudinally extending end plates 152, 154. End plates 152, 154 are each bonded to a set of platelets 156, 158, which are, in turn, bonded to a midplate 160 extending along the central axis of electrode 132. Each set of platelets 156, 158 preferably comprises between 1–10 individual platelets 159, as shown in FIG. 5B. Platelets 159 are generally rectangular (before electrode 132 is machined as discussed below) and each platelet 159 has a thickness of about 0.0025 to 0.25 cm. Plates 152, 154 and 160 are also generally rectangular and have a thickness of at least 0.25 cm.

Platelets 159 are preferably diffusion bonded to each other and to end plates 152, 154 and midplate 160 to form a thermal and electrical connection therebetween. End plates 152, 154 and midplate 160 may require grinding to create an adequate diffusion bond with the platelets. The diffusion bonds should be strong enough to permit flow of heat and arc current therebetween and to prevent water leakage from coolant flowing through annular gap 144.

After the plates and platelets have been suitably bonded together, electrode 132 is machined into a generally cylindrical shape, as shown in FIG. 5B. Of course, it will be readily recognized by those skilled in the art that electrode 132 may comprise other conventional shapes. As shown in FIG. 1A, a central bore 164 is formed through electrode 132 for passage of the plasma arc. Bore 164 will preferably have a diameter slightly larger than the thickness of midplate 160 so that it can be formed by machining midplate 160 and a number of platelets 159 from each group of platelets 156, 158, as shown in FIG. 5B. This configuration facilitates fabrication of the various gas channels, as described in more detail below.

With reference to the gas channels, end plates 152, 154 each define a passageway 166, 168 in fluid communication with secondary gas line 140 for injecting gas into bore 164. As shown in FIGS. 5A and 5B, a group of the first set of platelets 156 each define a generally longitudinal slot 170 (only one of the slots is shown in FIG. 5A). The slots 170 are aligned with each other to form a channel 172 spaced radially outward from bore 164 (FIG. 5B). Similarly, a group of the second set of platelets 158 each define a generally longitudinal slot 176, which are aligned to form a channel 178 on the opposite side of bore 164. Channels 172, 178 are generally parallel to bore 164 and preferably extend substantially the entire length of bore 164. Channels 172, 178 are formed by stamping, chemically etching, or laser cutting slots 170, 176 into each platelet 159 before the platelets are bonded together.

The number of platelets 159 in each set that include a slot 170 or 176 will depend on the configuration of electrode 132. In a preferred embodiment, the outer platelets 180, 182 define slots 170, 176 in fluid communication with passageways 166, 168, respectively, so that channels 172, 178 are fluidly coupled to passageways 166, 168 (see FIG. 5B). At least one of the platelets 159 in each set also defines a plurality of transverse passages 186 in communication with its corresponding slot 170, 176 and with bore 164 for injection of gas into bore 164 (see FIG. 5A). Passages 186 preferably have a substantially smaller cross-section than channels 172, 178 to restrict the amount of gas flow allowed through each passage 186. Passages 186 are spaced in specified intervals, preferably 0.25 to 1.25 cm apart, along the axis of electrode 132 to inject gas along the length of bore 164, as shown in FIG. 5A. Passages 186 extend from each set of platelets 130, 132 at the same axial location so that there are two opposite injection sites at each axial location along bore 42'.

Similar to the above embodiments, passages 186 extend substantially tangentially toward bore 164 so that the gas will swirl around the exposed surface 188 of electrode 132, as shown in FIG. 5B. This promotes arc foot rotation thereby eliminating the erosion which occurs when the arc foot rotates too slowly, or not at all.

The above is a detailed description of various embodiments of the invention. It is recognized that departures from the disclosed embodiments may be made within the scope of the invention and obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A plasma torch electrode comprising multiple electrically conductive plates having a thickness, the plates being transverse to an axis of said electrode in the direction of said thickness, and joined together to form an electrical connection there between, at least one of said plated defining a channel transverse to said electrode axis and having an inlet adapted for coupling to a source of gas, a first group of said plates having a perimetrical side surface and a first opening spaced radially inward therefrom, said first group of said plated being arranged so that said first openings are aligned to form a bore through said electrode, said bore having an inlet in fluid communication with said channel for gas injection into said bore.

2. The electrode of claim 1 wherein a plurality of said plates each define a slot transverse to said electrode axis, said slots being aligned with each other to form a gas channel, one of said plates further defining at least one passageway transverse to said channel for coupling said channel with said bore.

3. The electrode of claim 2 wherein said one of said plates defines a plurality of passageways coupling said channel with said bore, said plurality of passageways being spaced from each other in the direction of the electrode axis.

4. The electrode of claim 3 wherein said passageways are spaced between about 0.25 to 1.25 cm apart.

5. The electrode of claim 3 wherein said passageways extend substantially tangential to said bore to permit gas injection with swirl.

6. The electrode of claim 3 wherein said passageways have a cross-sectional area substantially smaller than a cross-sectional area of said channel.

7. The electrode of claim 1 wherein said multiple plates comprise first and second end plates, a central plate, a first set of platelets stacked between and joined to the first end plate and the central plate and a second set of platelets stacked between and joined to the second end plate and the central plate.

8. The electrode of claim 7 wherein said end plates and said central plate each have a thickness of at least 0.25 cm.

9. The electrode of claim 7 wherein said platelets each have a thickness between 0.0025 to 0.25 cm.

10. The electrode of claim 7 wherein said first and second sets of platelets each comprise between 2 and 10 individual platelets.

11. A plasma torch electrode comprising multiple electrically conductive platelets that are stacked together to form an electrical connection therebetween, a first group of said platelets having a perimetrical side surface and a first opening spaced radially inward therefrom, said first group of said platelets being arranged so that said first openings are aligned to form a bore through said electrode, a second group of said platelets each defining a slot transverse to an axis of said electrode, the slots being aligned to form a gas channel through said electrode, said channel having an inlet adapted for coupling to a source of gas and an outlet in fluid communication with said bore for gas injection into said bore.

12. The electrode of claim 11 further comprising first and second end plates electrically joined to either side of said multiple platelets, said first and second end plates each having a passage coupling said gas source to said channel.

13. The electrode of claim 11 wherein a third group of said platelets each define a slot transverse to an axis of said electrode, the slots being aligned to form a second gas channel through said electrode, said second gas channel being spaced radially outward from said bore opposite said first gas channel.

14. The electrode of claim 13 wherein one of said third group of said platelets defines a plurality of passageways coupling said second gas channel to said bore.

15. A plasma torch comprising:

a housing;

a first electrode positioned in said housing and having an axis, said first electrode having multiple electrically conductive platelets that contact each other to forma an electrical connection therebetween, at least one of said platelets defining a channel transverse to the axis of said first electrode and having an inlet adapted for coupling to a source of coolant, a first group of said platelets having a perimetrical side surface and as first opening space radially inward therefrom, said first group of said platelets being arranged so that said first openings are aligned to forma bore through said electrode, said bore having an inlet in fluid communication with said channel;

a second electrode having a first portion adapted for coupling to a power source and a second portion extending into said bore of said first electrode; and a gas line within aid housing having a first end connected to said bore and a second end adapted for coupling to a gas source for introducing gas into said bore.

* * * * *